(12) United States Patent  (10) Patent No.: US 6,237,614 B1
Retter  (45) Date of Patent: May 29, 2001

(54) RETRACTABLE VEHICLE WASH SYSTEM

(76) Inventor: Dale Retter, 7845 E. Ocotillo Rd., Scottsdale, AZ (US) 85250

( * ) Notice: Subject to any disclaimer, the term of this patent is extended or adjusted under 35 U.S.C. 154(b) by 0 days.

(21) Appl. No.: 09/286,148

(22) Filed: Apr. 5, 1999

(51) Int. Cl.⁷ .................................................. B08B 3/02
(52) U.S. Cl. ...................... 134/99.1; 134/123; 134/183; 134/172
(58) Field of Search .................................... 134/123, 172, 134/99.1, 103.3, 104.2, 183; 118/DIG. 7; 4/599, 558, 608, 609, 610

(56) References Cited

U.S. PATENT DOCUMENTS

| 101,678 | * | 4/1870 | Taft . | |
|---|---|---|---|---|
| 298,585 | * | 5/1884 | Horning . | |
| 689,164 | * | 12/1901 | Castle | 4/599 |
| 844,220 | * | 2/1907 | Westbrooke | 118/DIG. 7 |
| 1,049,714 | * | 1/1913 | Herscovitz . | |
| 1,450,218 | * | 4/1923 | Nenoff . | |
| 1,520,796 | * | 12/1924 | Bartling . | |
| 1,844,038 | * | 2/1932 | Hooker . | |
| 2,536,843 | * | 1/1951 | Dye | 134/123 |
| 2,561,265 | * | 7/1951 | Burns . | |
| 2,689,577 | * | 9/1954 | Dunn et al. | 134/123 |
| 2,698,629 | * | 1/1955 | Hall | 134/123 |
| 2,852,784 | * | 9/1958 | Winkler . | |
| 3,067,434 | * | 12/1962 | Neal et al. . | |
| 3,080,568 | * | 3/1963 | Burnett . | |
| 3,088,472 | * | 5/1963 | Haines | 134/123 |
| 3,293,664 | * | 12/1966 | Coons | 4/599 |
| 3,324,868 | * | 6/1967 | Kaufman | 134/123 |
| 3,353,546 | * | 11/1967 | Mahoney | 134/123 |
| 3,401,707 | | 9/1968 | Horwitz . | |
| 3,590,398 | * | 7/1971 | Jetter | 4/599 |
| 3,600,720 | * | 8/1971 | Marschall | 4/599 |
| 3,629,875 | * | 12/1971 | Dow et al. . | |
| 3,657,746 | * | 4/1972 | Downey . | |
| 4,303,087 | * | 12/1981 | Flaxman | 134/123 |
| 4,413,363 | * | 11/1983 | Troiano . | |
| 4,453,280 | * | 6/1984 | Greenleaf . | |
| 4,539,720 | * | 9/1985 | Westweller . | |
| 4,675,923 | * | 6/1987 | Ashley . | |
| 4,719,832 | * | 1/1988 | Buton | 134/123 |
| 4,848,384 | | 7/1989 | Christopher . | |
| 4,977,912 | | 12/1990 | Oota . | |
| 5,078,089 | * | 1/1992 | Dugan et al. | 134/183 |
| 5,216,763 | * | 6/1993 | Grenier . | |
| 5,255,695 | | 10/1993 | Downey . | |
| 5,266,123 | * | 11/1993 | Brabd | 134/123 |
| 5,329,949 | | 7/1994 | Moncourtois . | |
| 5,413,128 | | 5/1995 | Butts . | |
| 5,446,930 | * | 9/1995 | Clark . | |
| 5,564,138 | * | 10/1996 | Simpson . | |
| 5,638,843 | | 6/1997 | Strickland . | |

* cited by examiner

Primary Examiner—Frankie L. Stinson
(74) Attorney, Agent, or Firm—LaValle D. Ptak

(57) ABSTRACT

A vehicle washing system is mounted adjacent the ceiling of a garage or other structure. It includes an upper frame and a mat is located beneath the frame for catching and draining off fluids used during the washing operation. After a vehicle is driven onto the mat beneath the frame, a mechanism is operated to lower a waterproof curtain from the frame down to a point adjacent the mat to completely surround the vehicle. In addition, fluid conduit rings also are lowered from the frame to various positions surrounding the vehicle. Nozzles in these rings are directed toward the vehicle location and washing and rinsing fluid is supplied, under pressure, to the rings in a pre-established sequence to effect the washing of the vehicle. In addition, hot air drying tubes and nozzles are lowered from the frame when the device is in use to permit the application of hot drying air to the vehicle after the washing cycle has been completed. After the vehicle has been washed and dried, the curtain, the fluid supply rings, and the dryer hoses are raised back into a stored position adjacent the frame; and the vehicle then may be driven away.

17 Claims, 4 Drawing Sheets

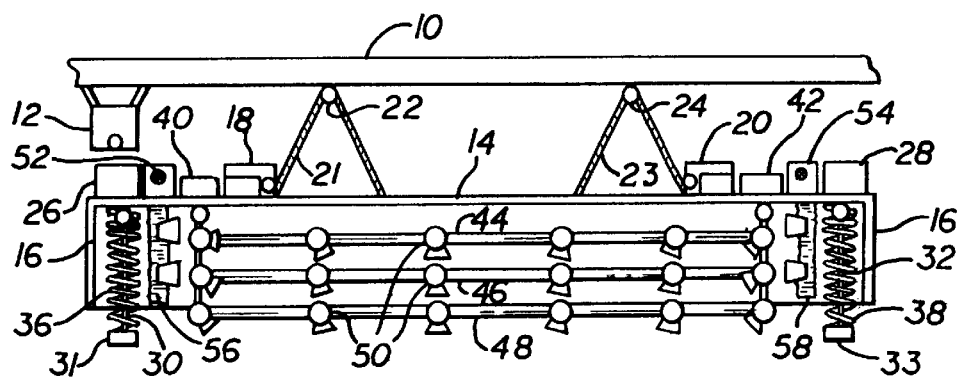
FIG. 1
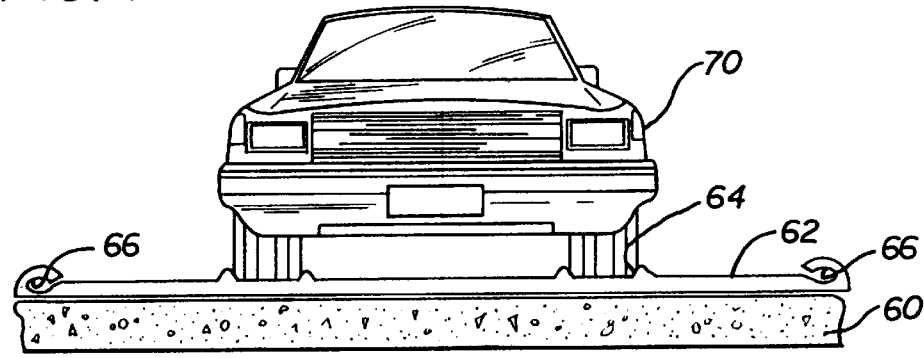
FIG. 2
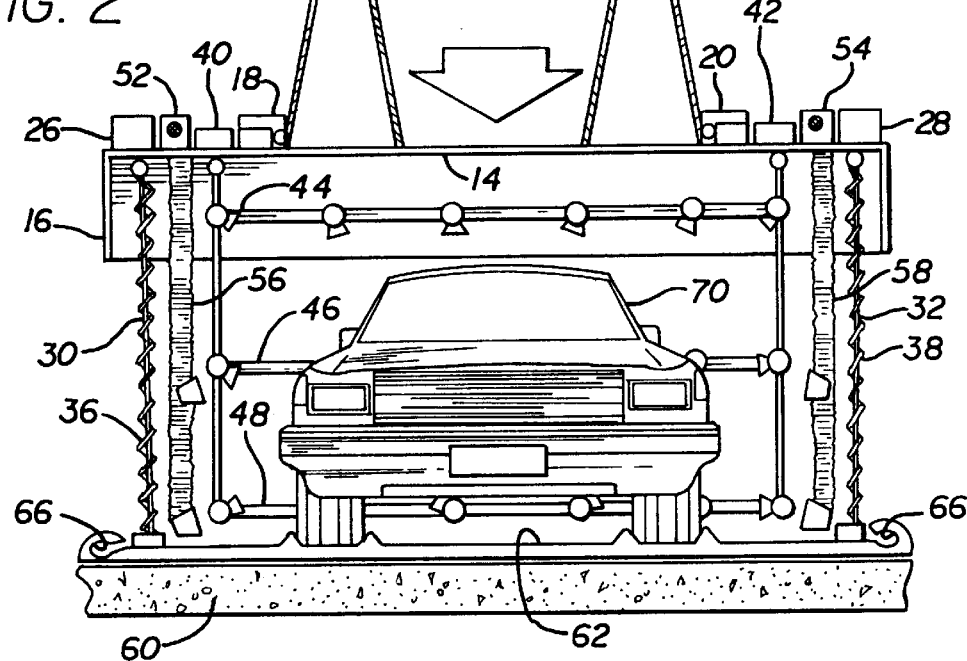

RETRACTABLE VEHICLE WASH SYSTEM

BACKGROUND

Generally, two basic methods exist for private individuals to clean the exterior of their automobiles and light trucks. One of these methods is hand washing. A hand wash generally is accomplished with a great deal of personal physical work. Most of the scrubbing and rubbing is provided by muscle power. Garden hoses, buckets, hand brushes, sponges and drying cloths are the typical tools. High pressure water hoses or rotating brushes driven by water pressure also are available, and frequently are used to assist the primarily human muscle powered efforts.

A second, highly popular method of washing private automobiles is to visit a fixed commercial car wash facility. Most of these facilities employ elaborate automatic machinery, including moving conveyors to carry or push a car through a sequence of stations, each performing a specialized function. Typically, a first station may spray the car with a soapy wash. A second station applies rotating brushes to the front and sides of the vehicle. Another station applies a brush or oscillating elongated scrubbing cloths to the top of the vehicle. Yet another station brushes the front and back; and another applies a water rinse. Occasionally, additional stations are used to apply a wax or polish; and a final station generally blows hot air to dry or nearly dry the vehicle.

The economies of operating such a facility and customer demand usually require that the customer be processed relatively quickly, usually within eight to 15 minutes. Because cars must continuously travel through the various stations of such an automatic car wash facility, the time spent at each of the stations by any individual vehicle necessarily is small.

Usually, in order to get a dirty automobile or light truck clean, brushing is required. Brushing invariably produces some scratching or abrasion of the surface finish. Even though such abrasion is generally almost unnoticeable, some car enthusiasts advise never using such an automatic car wash. Brushing also may damage the radio antenna or car trim, particularly if the trim is somewhat loose at the time the car is passed through the commercial car wash facility.

Some commercial car wash facilities provide brush-free washes. These brush-free washes usually employ very high pressure water sprays or large amounts of hand labor to clean a dirty automobile or light truck quickly. High pressure sprays themselves may cause damage, such as loosening or removing trim, forcing water into undesired openings, or creating leaks. Brush-free car washes also may produce a car which is less than totally clean; or such car washes may take longer than a brush-based system.

Even if an ideal brushless, high speed commercial car wash facility, which overcame all of the disadvantages of current facilities, were to be designed, there still is the disadvantage of traveling to such a facility in order to obtain a car wash. Typically, persons desiring to have a car washed at a commercial facility need to do it on their time off, which means that such facilities are crowded on the way to work, the way home, lunchtime, or over weekends and holidays. As a result, persons frequently need to wait in line in order to get the car washed; and the total time consumed for the washing of the car, from the time a person enters the facility until he or she leaves that facility, is significantly greater than the actual time required for the wash itself. These are significant disadvantages, and result in a substantial waste of time for persons who rely upon commercial car wash facilities for cleaning their vehicles.

Attempts have been made to provide car wash facilities which do not require the user of the vehicle to drive to a commercial facility, and which also do not require hand washing by others or by the owner of the vehicle. One such vehicle washing device is disclosed in the U.S. patent to Horwitz U.S. Pat. No. 3,401,707. This patent is directed to a portable vehicle washing device which is carried to a position adjacent the vehicle. One set of pipes extends along the length of the vehicle, adjacent its side; and another circular pipe is extended over the top of the vehicle. Water under pressure then is applied to the pipes, and nozzles spaced in the pipes spray water under pressure onto the vehicle. This patent represents an attempt to provide a compromise solution between hand washing of a vehicle and a commercial car wash. The device can be erected in almost any location where water is available. A disadvantage, however, is that the portability of the device necessarily limits its effectiveness. It also must be moved from one side of the vehicle to the other, or from one position adjacent the vehicle to another one, in order to complete the washing cycle.

Another system which has been designed to overcome some of the disadvantages mentioned above is disclosed in the patent to Moncourtois U.S. Pat. No. 5,329,949. This patent is a dedicated car wash box which is located within a garage. This device, however, requires the vehicle to move through a nozzle station adjacent the door opening as the vehicle is driven into the garage. Once the vehicle is inside, the washer elements are turned off; and the vehicle is allowed to dry within the garage. This is a dedicated system, which is located at the entry to the garage. It always is in place, and relies upon a single pass through the washing station for the car wash operation.

Other patents directed to portable or individual car wash systems have been obtained. One of these is the U.S. patent to Strickland U.S. Pat. No. 5,638,843. This patent is a portable, collapsible car wash device in the form of a U-shaped set of vertical and horizontal conduits. The device is set up; and the vehicle then is driven through the water spray to wash it. In its manner of operation, the device of this patent is similar to that of the Montcourtois patent described above. Strickland, however, is designed to be set up in any convenient location.

Two other patents directed to a similar technique are the patents to Downey U.S. Pat. No. 5,255,695 and Butts U.S. Pat. No. 5,413,128. Both of these patents require a rather elaborate, permanently installed car washing station. In Downey, the nozzles are fixed and the car is driven through them from one end to the other. In this respect, the device resembles a small commercial car washing facility. In the Butts patent, the car wash station includes a movable fluid dispensing system which moves back and forth over a stationary car. The devices of both of these patents are intended for personal car wash applications; but clearly they require a dedicated space solely for the use of the car wash mechanisms.

It is desirable to provide a vehicle washing system which overcomes the disadvantages of the prior art mentioned above, which reduces cost, inconvenience, effort and wasted water, and which also may be installed in home garages, long term parking facilities, or on a platform placed over a parked vehicle.

SUMMARY OF THE INVENTION

It is an object of this invention to provide an improved vehicle washing system.

It is another object of this invention to provide an improved vehicle washing system which is installed in an out of the way location when it is not in use, and which is ready for use upon demand.

It is another object of this invention to provide an improved, retractable, vehicle washing system.

It is a further object of this invention to provide an improved retractable individualized vehicle washing system which may be mounted in a home garage, and which provides an automatic washing sequence for a parked or stationary vehicle.

In accordance with the preferred embodiment of the invention, a vehicle washing system includes an upper frame designed to be mounted above a location where a vehicle is to be parked and washed. A flexible retractable curtain is mounted on the frame for movement from a storage position adjacent the frame to a use position extended from the frame and surrounding a vehicle parked below the frame. A number of fluid conduit rings are mounted on the frame for movement from a storage position adjacent the frame to a use position at different distances from the frame. These fluid conduit rings surround the vehicle at different horizontal elevations; and the rings include a plurality of spaced spray nozzles for directing fluid toward a vehicle parked below the frame and surrounded by the fluid conduit rings. Provision is made for selectively moving the curtain member and the fluid conduit rings between the storage and use positions; and a fluid supply is provided to deliver fluids under pressure to the fluid conduit rings.

BRIEF DESCRIPTION OF THE DRAWINGS

FIG. 1 is a partially cut-away end view of a preferred embodiment of the invention in a first or storage position;

FIG. 2 is a cut-away end view of the embodiment shown in FIG. 1 in its use position of operation;

DETAILED DESCRIPTION

Figure 3:
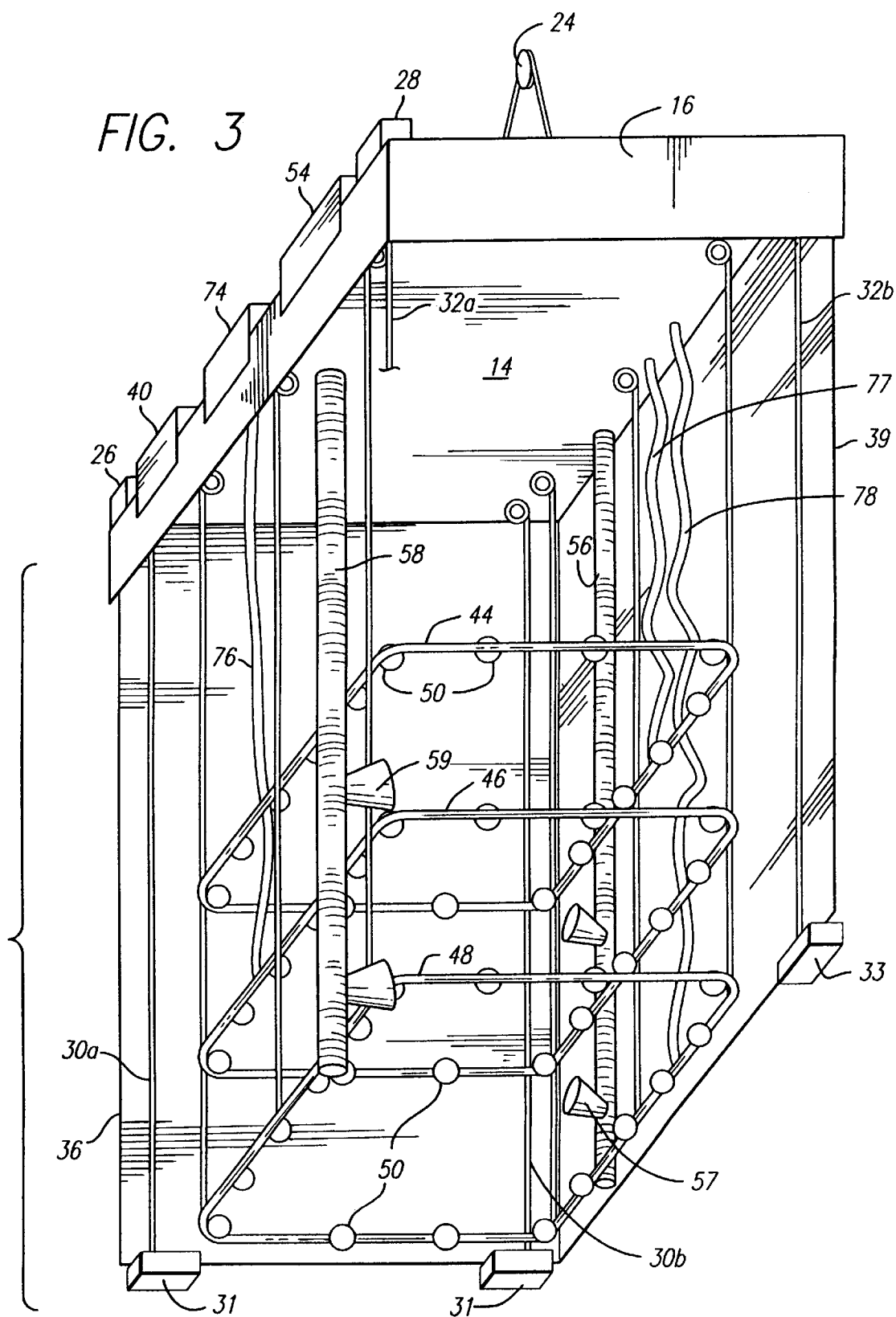
FIG. 3 is a bottom perspective view of the embodiment shown in the use position of FIG. 2.

Reference now should be made to the drawings, in which the same reference numbers are used throughout the different figures to designate the same or similar components. As shown in FIGS. 1,2 and 3, a vehicle washing system which may be used in any fixed location, such as in a home garage, is illustrated. The primary components of the system are suspended from the roof 10 of the garage. As illustrated in FIGS. 1 and 2, the roof 10 of the garage also includes, typically, a garage door opener 12 located in a position similar to the one shown in FIGS. 1 and 2. The floor 60 of the garage has a water trapping drainage mat 62 located on it. The mat 62 also may have some guides 64 formed in it to assist in locating a vehicle 70 in a central position beneath the automatic vehicle washing system components. The mat 62 also has a raised curb 66 located on its sides and on at least the forward end (the end opposite the garage door opening) to allow wash water to be contained on the mat 62 and to drain off the mat at the garage door end. The curb 66 also could be formed on all four sides of the mat 62 if desired.

As illustrated in FIGS. 1 and 2, the curb 66 also has a channel along the edges which may be used to guide water from the vehicle washing system to a convenient drain. A drainage hose may be attached to the channel to dispose of the water in a drain, or alternatively, to pass underneath a closed garage door or through a small hole to reach an area which might benefit from the drainage water.

In the ceiling of the garage 10, a pair of support pulleys 22 and 24 (or additional pulleys, if necessary) are provided to suspend, by means of a pair of cables 21 and 23, an upper frame consisting of a top 14 and downwardly depending sides 16. The sides 16 extend downwardly from the edges of the rectangular top 14 of the frame on all four sides. This frame 14/16, in the storage or non-use position, is located as shown in FIG. 1, suspended just below the ceiling 10 of the garage or other location in which the vehicle washing system is used. A pair of motors 18 and 20 are used to wind and unwind the cables 21 and 23 under control of an operating sequence which is established by a panel shown in FIG. 4, or by an automatic timing system, from a storage position shown in FIG. 1 to the use position shown in FIG. 2. It is apparent from an examination of FIGS. 1 and 2 that, when the vehicle washing system is to be used, the entire frame 14/16 is lowered in the direction of the arrow shown in FIG. 2 from the position in FIG. 1 to the one in FIG. 2.

Once the washing system is in the position shown in FIG. 2, a pair of motors 26 and 28 are operated to unwind support cables, such as the cables 30A, 30B, 32A and 32B, shown most clearly in FIG. 3, to lower a pleated or flexible curtain 36/38/39/40 (garage door side 40, not shown) from the position shown in FIG. 1 to the one shown in FIGS. 2 and 3. Weights 31 and 33 located at the four corners of the pleated curtain assembly assist in the lowering of the pleated curtain to the position shown in FIGS. 2 and 3. When the weights 31 and 33 strike or rest upon the upper surface of the mat 62, sensors in the bottoms of the weights may convey a positional signal to turn off the motors 26 and 28, much in the same manner as garage door openers are turned off when the lower limit of the door is reached. Since this is a conventional technique, no details showing this feature are considered necessary here.

Simultaneously with the lowering of the curtain, or sequentially following the lowering of the curtain 36/38/39 and 40, another set of motors 40 and 42 is operated to lower three fluid conduit rings 44, 46 and 48 from the storage position shown in FIG. 1 to the position shown in FIGS. 2 and 3. The rings are interconnected; so that the ring 44-is located in a position just above the vehicle 70, the ring 46 is located at approximately the mid section of the vehicle 70, and the ring 48 is located beneath the vehicle 70, just above the mat 62. As is readily apparent from an examination of FIGS. 2 and 3, the rings 44, 46 and 48 are located in parallel horizontal planes.

Each of the rings 44, 46 and 48 carry a number of spaced-apart spray nozzles 50, which are turned or adjusted to spray toward the vehicle 70 on different areas thereof to effect fluid contact with the vehicle from the different positions of the rings 44, 46 and 48. As is most readily apparent from an examination of FIG. 2, for example, the spray nozzles in the rings 44 are directed angularly downwardly toward the top surfaces of the vehicle. The spray nozzles in the ring 46 are directed generally horizontally toward the sides of the vehicle; whereas the spray nozzles 50 in the ring 48 are directed slightly upwardly to spray along the lower edges and underside of the vehicle to effect a complete washing of the vehicle when the system is in used.

Fluid delivery hoses or conduits 76, 77 and 78 are connected, respectively, to the fluid supply rings 46, 44 and 48 for delivering fluid to those rings. These delivery hoses may be made of a flexible, helically coiled material; so that they tend to be spring loaded into a storage position when the device is in its non-use or storage position as shown in FIG. 1, and extend by stretching when the apparatus is lowered into the position shown in FIGS. 2 and 3. Once again, various types of materials and techniques for achieving this ability to extend the hoses 76, 77 and 78 to the position shown in FIGS. 2 and 3, from a collapsed or stored position when the device is in the configuration shown in FIG. 1, are well known. It should be noted, however, that each of the fluid delivery rings 44, 46 and 48 is supplied by a different one of the fluid delivery hoses 76, 77 and 78, as is apparent from an examination of FIG. 3.

The car washing system includes one other set of components in the form of telescoping air hoses 56 and 58, provided with air dispensing nozzles 57 and 59, as illustrated in FIG. 3. These hoses also move from a collapsed or storage position, as shown in FIG. 1, to a use position as shown in FIGS. 2 and 3.

From an examination of FIG. 2 in particular, it is apparent that the curtain 36/38/39/40 completely surrounds and encases the vehicle 70. The curtain may be made of any suitable material, either transparent or opaque. It is desirable that the curtain 36/38/39/40 be made of waterproof material; so that any water spray which otherwise might splash about when a vehicle 70 is being washed is contained within the enclosed curtain area, and therefore drops to the mat 62 without contacting any other areas around the car wash position. It also is apparent that the rings 44, 46 and 48 are located between the vehicle 70, as shown in FIGS. 1 and 2, and the curtain; so that water or other fluids which are dispensed from the nozzles 50 in the rings 44, 46 and 48 are directed directly onto the vehicle 70 without any interference. The air delivery hoses 56 and 58 are located in the space between the curtain 36/38/39/40 and the region of the wash rings 44, 46 and 48. Thus, the air delivery hoses 56 and 58 do not interfere with the washing which is effected by means of the nozzles 50 and the wash rings 44, 46 and 48.

Figure 4:
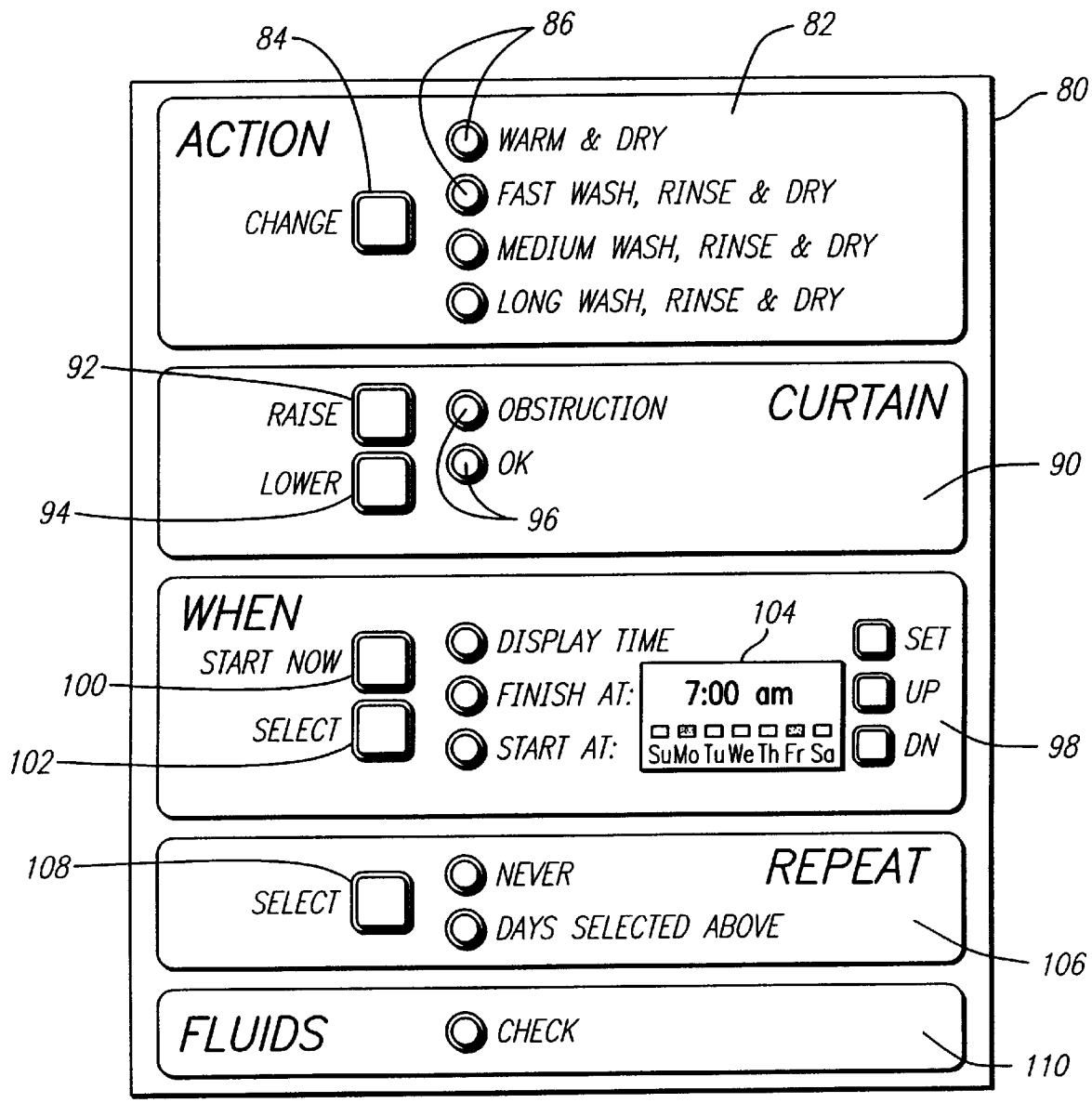
FIG. 4 illustrates a control panel used in conjunction with the embodiment of the invention shown in FIGS. 1 through 3.
Figure 5:
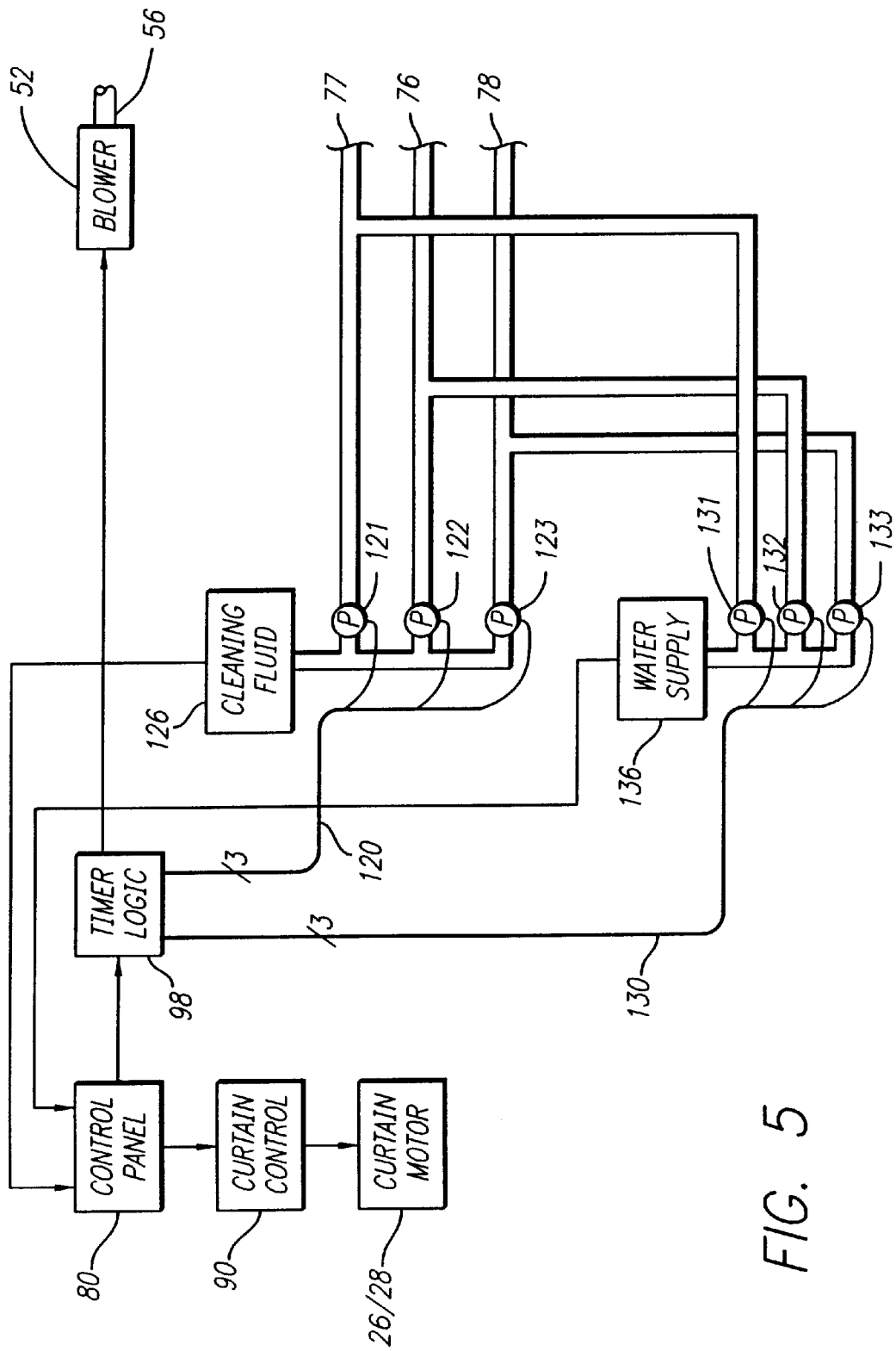
FIG. 5 is a schematic diagram of the operating system for the embodiment of the invention shown in FIGS. 1 through 3.

Once the vehicle is in the position shown in FIGS. 1 and 2 and the mechanism has been lowered to its operating position as shown in FIGS. 2 and 3, the washing sequence takes place. Reference now should be made to FIGS. 4 and 5. As illustrated in FIG. 4, a control panel 80 for the system includes various settings similar to those used for a dishwasher, washing machine, or automatic sprinkler system, along with a suitable timer. Systems employing many of the features of the control panel of FIG. 4 are used in conjunction with automatic sprinkler systems and the like, which operate different devices at preprogrammed times or in preprogrammed settings and intervals. Such techniques are well known, and for that reason the internal details for the electronics for carrying out the various timing functions are not illustrated.

FIG. 4, however, does illustrate the different functional modes of operation which are effected by typical timing systems used in conjunction with the system shown in FIGS. 1 through 3. For example, in the top panel 82 of the control panel 80, an action panel is shown. A change push-button 84 causes the internal circuitry to move through one of the four different settings 86 which are illustrated. These settings, for purposes of illustration here, provide sequences of operation for "warm and dry", "fast wash, rinse and dry", "medium wash, rinse and dry", or "long wash, rinse and dry".

The second section of the panel 80 is the section 90, which is directed to the operation of the curtain. This section has "raise" and "lower" push-buttons for manual operation. Indicator lights 96 show whether or not an obstruction has been detected. Although not described previously, the lower edge of the curtain sides 36/38/39/40 may be provided with sensors to indicate whether the curtain has been fully deployed, or whether an obstruction has been encountered. Obviously, if an obstruction is encountered so that the curtain is not all of the way to the mat 62 on all four sides, operation of the fluid application through the fluid rings 44, 46 and 48 should not be initiated, since fluid integrity of the washing system would not be guaranteed.

The section 98 of the control panel 80 indicates the options of selecting when the car wash should commence, either immediately or at some preprogrammed time. These options may be set by programming a clock (much in the same manner as a time-bake or time delay operation in a modern cook stove). A clock 104 is used to indicate the various starting and finishing times, if the times are set to be something other than immediately.

The final two sections of the display shown in FIG. 4 are panel No. 106, which is used to select automatic repetition of the programming set forth in the operation of the section 98 of the panel, or to eliminate automatic repetitive operation by selecting the "never" option. The final section 110 of the control panel 80 simply carries a warning light (or lights) to indicate when a fluid level is low.

FIG. 5 illustrates the overall operating system for effecting the operation of the fluid delivery in the fluid supply rings 44, 46 and 48, in conjunction with the other features described previously as shown. The control panel 80 is used to operate the various functions for timing, as described above, through a timer logic circuit 98. In addition, the control panel 80 is used to operate the curtain control 90, as described above in conjunction with FIG. 4; and this control is used to effect the operation of the curtain motors 26 and 28 described previously.

Once the curtain is in position and the indicator 96 provides a signal through the control panel 80 that no obstructions are present, the timer logic 98, which has been preprogrammed as described above in conjunction with FIG. 4, commences operation. Essentially, the timer logic 98 operates to control the application of cleaning fluids, water supply (and other fluids such as wax and the like, if they are to be included) to the system.

As illustrated in FIG. 5, the timer logic 98 is shown as controlling the operation of the application of cleaning fluid from a reservoir 126 or water supply from a reservoir 136, in accordance with a sequence which is established by the sequence in the timer logic. Control essentially is applied from the timer logic through a bus 120 to control three pumps 121, 122, 123 supplied from the cleaning fluid reservoir 126 and through a bus 130 to control three pumps 131, 132 and 133 connected with the water supply reservoir 136. The sequence of operation of the pumps 121, 122, 123 and 131, 132, 133 is effected in a manner similar to that used to electrically control an automatic sprinkler system. The operation of the whole washing system, for a long wash, rinse and dry could take as much as six hours. During this time, various valves (shown as the pumps 121 through 133) may be operated to allow selected ones of the jets 50 to intermittently spray and let soak the entire exterior of the vehicle. The curtain 36/38/39 and 40 entraps moisture and moist air, keeping and preventing premature drying of the vehicle.

Generally, the sprays start at the top of the vehicle; so that by way of example, a pre-rinse may be initiated first by means of the pump 131 supplying high pressure water to the nozzles in the ring 44. The pump 131 then is turned off and the pump 132 is turned on, followed by turning off the pump 132 and turning on the pump 133. This effects a pre-rinse of the entire vehicle. Generally, the vehicle then is allowed to remain in the wet state effected by this initial rinsing to allow the moisture to work on and soak the exterior of the vehicle and any dirt that is still on the vehicle after the rinse cycle.

Next, a washing cycle, using the cleaning fluid 126, may be initiated. The pumps 131 through 133 are off at this time; but a sequential operation of the pumps 121, 122, 123 under control of the timer logic 98 may be effected to sequentially deliver a soap/water solution, or other cleaning solutions, from the fluid delivery rings 44, 46, 48 much in the same manner described above in conjunction with the supply of pre-rinse water to those same rings. After the washing of the vehicle with the cleaning fluid from the reservoir 126, a final rinse may be effected, again, by sequentially operating the pumps 131, 132, 133 to deliver water under pressure to the fluid delivery conduits or rings 144, 146, 148.

The length of time that cleaning fluid or water needs to be supplied from either of the reservoirs 126 or 136 to the vehicle may be a relatively short length of time; so that a large quantity of water and cleaning fluid is not necessary. The reason that a short length of time for each spray may be used, particularly coupled with high pressure through the use of the pumps 121 through 133, is that the curtain and the frame at the top of the device contain all of the moisture within the device during the washing cycle. Thus, long soak times may be utilized to allow water and cleaning fluids to slowly dissolve dirt with time, rather than using mechanical scrubbing. In addition, the convenience and low water and cleaning fluid usage which may be effected by this system permits frequent washing; so that repetition also helps to maintain a clean vehicle exterior.

Although it has not been illustrated in FIGS. 4 and 5, the wash cycle may be followed by a polish or a wax spray. This can be effected in the same manner as the application of cleaning fluid and water from the water supply is effected above by additional pumps coupled to the supply lines 76, 77, 78 ; so that any number of different solutions may be applied to the vehicle under the control of the system as set by the action operation on the panel section 82 of the control panel 80.

Once the washing and rinsing cycles have been completed, blower/heater elements 52 and 54, comprising air fans and heaters, are used to force hot air through the conduits 56 and 58 and the nozzles 57 and 59 to dry the vehicle. The drying period may be timed to be a fixed length of time; or it may be terminated whenever a moisture detector (not shown) determines that the area is dry. In cold climates, the drying cycle could be timed to terminate shortly before the vehicle was expected to be first driven in the morning, so as to provide the owner with a warmed vehicle, as well as one which is dry.

During all of the fluid spraying cycles described above and during the hot air drying period, the curtain 36/38/39/40 remains in its lowered position to contain both the water and the hot air. After the drying cycle is completed, the timer logic by way of the control panel 80 causes the units to retract under the operation of the different motors described previously from the position shown in FIG. 2 to the storage position shown in FIG. 1.

Other options which can be made a part of the overall cleaning system may include a battery, radio controlled or infrared controller to operate or program the system. Clearly, the system of the control panel 80 could be linked to a personal computer system if desired. As mentioned previously, the system may be programmed to operate automatically on certain days of the week and at certain times of the day, in the same manner as automatic sprinkling systems currently are controlled. As far as the cleaning fluid 126 and water supply 136 are concerned, the reservoirs for these various fluids may be located in any convenient location in the garage, and connected to the various pumps and supply lines shown by means of appropriate fluid conduits.

Provisions may be made for adjustment in the length and width of the curtain to best accommodate the particular vehicle intended to be used with the washing system. For example, the length or width of the curtain might be expanded or contracted, depending upon the size of the vehicle. Alternatively, the entire system may be sold in different sizes, for example, large for small trucks, standard for most cars, and compact for small compact cars. It also should be noted that the spray nozzles 50 typically are mounted on the rigid fluid supply rings 44, 46 and 48 in a movable or adjustable manner. For example, the sprayers may be mounted on lockable swivel heads; so that if an area of an owner's vehicle is not covered by the default spray pattern supplied initially with the system, the nozzles can be adjusted to provide complete coverage or a concentrated coverage to clean consistently dirtier portions of the vehicle. Other additions or adjustments to the system also may be made.

It should be noted that in conjunction with the system which has been described above, an inter-lock between the garage door opener system and the retractable vehicle wash system may be included. For example, if the vehicle wash system is mounted to straddle the path of the garage door (that is, with support cables 21 and 23 on either side of the garage door), and further if all the equipment on the top of the frame 14 is of a low profile which does not interfere with the garage door, the device may be operated whether the garage door is in its closed or open position. The door could be opened from a closed position when the device is in the operating position shown in FIGS. 2 and 3. In some instances, however, the frame 14 and all of the equipment which is mounted on it may be mounted above the open position of a retractable garage door. If this is the situation, clearly an inter-lock needs to be provided to prevent the garage door from being moved from a closed position to an opened position whenever the car wash system is in the operating position shown in FIGS. 2 and 3. Such inter-locks readily may be provided, and do not in any way affect the operation of the system which has been described above.

The foregoing description of the preferred embodiment of the invention is to be considered illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A vehicle washing system including in combination:
an upper frame adapted for mounting above a location where a vehicle is to be washed;
a flexible retractable curtain member mounted on said frame for movement from a storage position adjacent said frame to a use position extended from said frame and surrounding a vehicle parked below said frame;
a plurality of fluid conduit rings mounted on said frame for movement from a storage position adjacent said frame and adjacent one another to use positions at different distances from said frame for each of said fluid conduit rings, said fluid conduit rings in the use positions thereof being located between said curtain member and a vehicle parked below said frame;

a plurality of spaced spray nozzles on each of said fluid conduit rings located for directing fluid toward a vehicle parked below said frame;

a device for selectively moving said curtain member and said fluid conduit rings between the storage position above the top of a vehicle and the position surrounding a vehicle; and a fluid supply for delivering fluids under pressure to said fluid conduit rings in the use positions thereof.

2. The combination according to claim 1 wherein said curtain member is a waterproof curtain member.

3. The combination according to claim 2 wherein said fluid supply selectively delivers fluid under pressure to each of said fluid conduit rings in a predetermined sequence.

4. The combination according to claim 3 wherein said fluid supply includes sequentially operated pumps for delivering said fluid under pressure to each of said fluid conduit rings.

5. The combination according to claim 4 wherein said upper frame is designed for mounting on the ceiling of a garage above the top of a vehicle parked beneath the upper frame.

6. The combination according to claim 5 further including a water trapping mat located beneath said upper frame and placed beneath a vehicle parked below said frame for trapping water delivered by said vehicle washing system.

7. The combination according to claim 6 further including a device for raising and lowering said upper frame a predetermined amount from a non-use position located nearest the ceiling of a garage to a use position located a predetermined greater distance below the ceiling of a garage.

8. The combination according to claim 3 wherein said fluid supply includes a control system for delivering fluids of different types under pressure in a predetermined sequence to each of said plurality of fluid conduit rings.

9. The combination according to claim 8 wherein said fluid supply includes sequentially operated pumps for delivering said fluid under pressure to each of said fluid conduit rings.

10. The combination according to claim 1 further including an air blower mounted on said frame and a retractable air tube connected to said air blower for movement between a storage position adjacent said frame to a use position extended downwardly from said frame between said curtain member and a vehicle parked below said frame when said curtain member is in its extended use position.

11. The combination according to claim 1 wherein said upper frame is designed for mounting on the ceiling of a garage above the top of a vehicle parked beneath said upper frame.

12. The combination according to claim 11 further including a device for raising and lowering said upper frame a predetermined amount from a non-use position located nearest the ceiling of a garage to a use position located a predetermined greater distance below the ceiling of a garage.

13. The combination according to claim 1 wherein said fluid supply selectively delivers fluid under pressure to each of said fluid conduit rings in a predetermined sequence.

14. The combination according to claim 13 wherein said fluid supply includes sequentially operated pumps for delivering said fluid under pressure to each of said fluid conduit rings.

15. The combination according to claim 1 further including a water trapping mat located beneath said upper frame and placed beneath a vehicle parked below said frame for trapping water delivered by said vehicle washing system.

16. The combination according to claim 1 further including means for detecting whether said curtain member fully extends to the intended use position thereof and providing an indication of failure of such deployment.

17. The combination according to claim 1 further including an automatic control system for controlling the movement of said flexible retractable curtain member, the movement of said plurality of fluid conduit rings from the stored position and the use positions thereof, and for controlling the operation of said fluid supply at predetermined time intervals following deployment of said plurality of said fluid conduit rings to the use position thereof.

* * * * *